May 24, 1938.　　　R. R. BOLLMAN　　　2,118,291
ARC WELDING UNIT
Filed May 6, 1936

INVENTOR.
BY Roland R. Bollman
Wood & Wood ATTORNEYS.

Patented May 24, 1938

2,118,291

UNITED STATES PATENT OFFICE 2,118,291

ARC WELDING UNIT

Roland R. Bollman, Cincinnati, Ohio, assignor to The Commonwealth Manufacturing Company, Cincinnati, Ohio, a corporation of Ohio Application May 6, 1936, Serial No. 78,162

4 Claims. (Cl. 171—119)

This invention relates to the art of electric arc welding. More specifically, the invention resides in a simple arc welding outfit of the type adapted to operate on alternating current.

Electric arc welding in the past has been conducted by means of direct current, which it has been necessary to supply from relatively expensive and elaborate current generating apparatus. More recently, it has been proposed to use alternating current as the primary power source, but in such instances, likewise, the apparatus which has been required to accomplish the necessary current conversion has been intricate and expensive. Because of the fact that the arc welding apparatuses which have been available heretofore have been expensive to install, it has not been possible for the great majority of relatively small repair shops, machine shops, garages, and small manufacturing plants to obtain the benefits of the simplicity of arc welding, without physically transporting the elements to be welded to a welding plant or shop in which suitable apparatus is located.

It is the object of the present invention to provide a simple, inexpensive, arc welding unit which is suitable for use in conjunction with alternating current supplied from a conventional 110 volt or 220 volt plug outlet and which is satisfactory for performing a variety of arc welding operations.

Another object of the invention is to provide an arc welding apparatus which is compact and which conveniently may be moved from place to place.

Other objects and advantages of the invention will be apparent from the study of the following disclosures and the accompanying drawing in which.

Figure 1:
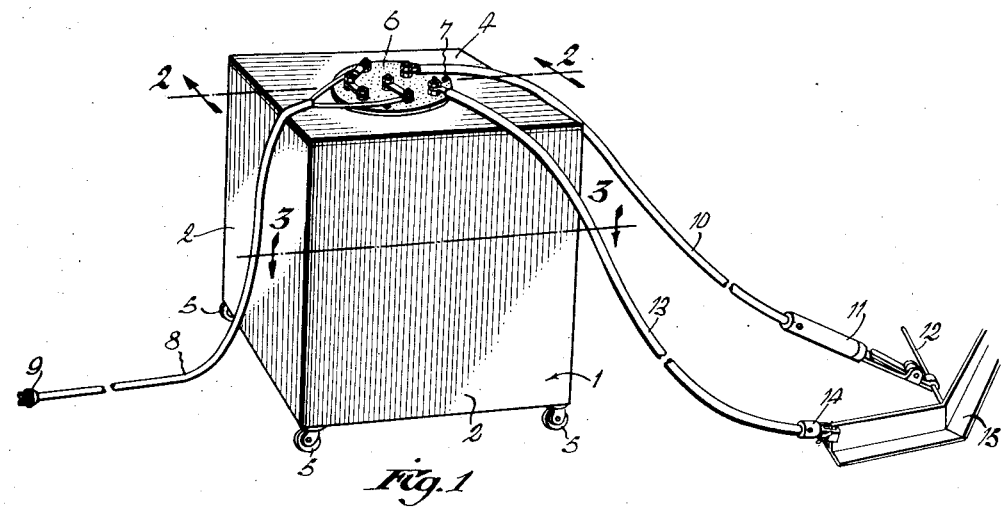
Figure 1 is a perspective view showing the apparatus assembled and ready for use.
Figure 3:
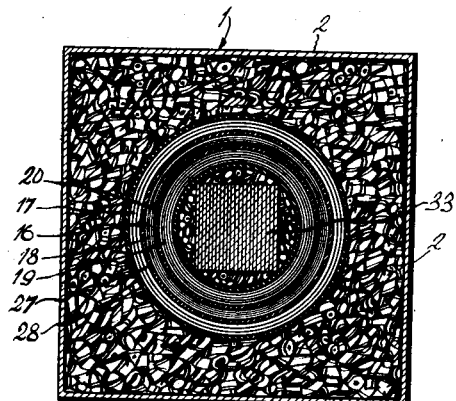
Figure 3 is a transverse cross section taken on the line 3—3 of Figure 1.

Briefly stated, the unit of the present invention comprises a simple casing within which a current conversion means is provided. Alternating current of 110 volts or 220 volts is delivered to the current conversion means within the casing through a terminal plate carried by the casing. A current of characteristics suitable for arc welding is applied from the current conversion means through the terminal plate to welding terminals, one of which is a ground terminal and the other of which is a terminal carrying a welding rod.

One of the features of the present invention is the electrical means by which ordinary alternating current is converted or transformed into an electric current which is suitable for arc welding purposes. In the apparatuses of the past the transformation of primary current into current suitable for arc welding purposes has been accomplished with the use of special types of transformers. In these devices the special current requirements have been accomplished electrically by means of special electrical circuits in the transformers. The electrical circuit windings by reason of their special nature have been relatively difficult and expensive to construct and the problem in the past has been considered a problem of circuits, primarily electrical in nature.

According to the present invention an electrical current suitable for arc welding purposes is accomplished with the use of a simple electrical circuit of the type found in an ordinary transformer, and the novelty by means of which the new result is accomplished resides in the magnetic media with which the simple circuit is associated.

Broadly speaking, the current conversion means comprises a primary winding, to which electrical power from a primary source is supplied and a secondary circuit comprising a coil winding embracing the primary coil winding, from which the arc welding current is delivered. The coil windings are concentrically related, and surrounded, encased, or housed in an aggregate of scrap iron confined in the casing enclosure. The electrical relationship of the coils to one another and the magnetic relationship of the coils within the mass of scrap iron function and cooperate to provide an electrical current suitable for arc welding when ordinary 25 to 60 cycle 110 volt or 220 volt alternating current is the source of supply.

Referring specifically to the drawing, the casing of the arc welding apparatus is indicated generally at 1 and comprises side wall members 2, a bottom member 3 and a top member or cover plate 4.

The casing preferably comprises a box-like structure which may be fabricated from sheet metal in the conventional manner and roller casters 5 are mounted at the bottom of the casing so as to accommodate shifting of the apparatus from place to place. A terminal plate 6 is mounted to the casing cover plate 4 by means of the attachment screws 7, and carries a plurality of terminals which are connected to the various electrical leads in the manner hereinafter more fully discussed.

Electrical current from a primary source is supplied to the arc welding apparatus through the electrical cord 8 which is attached to appropriate terminals on the terminal plate 6 and which at the other end carries a conventional plug 9 or other suitable supply connection means.

A welding lead 10 is connected to one of the output terminals of the apparatus and carries an electrode clamp 11, in which a welding electrode 12 is provided. A ground lead 13 is connected to the other output terminal and preferably includes a ground clamp 14 for rigid fastening to one of the elements to be welded. Figure 1 exemplifies the relationship of the output terminals during the welding of a joint between angle iron elements 15.

The means for effecting the conversion of alternating current supplied from an alternating current source through the input line 9, into current suitable for welding supplied through the output leads 10 and 13 is housed within the casing 1. In one sense the current conversion means is analogous electrically to a transformer, in that a primary winding, which is indicated generally in the drawing at 16 and a secondary means which is indicated at 17 are utilized. In magnetic arrangement, however, the primary and secondary windings totally are housed and surrounded by a mass of scrap iron made up of sheet trimmings, punchings, tailings and ordinary punch shop, run of mill small sized scrap iron of the type ordinarily baled and sold as waste iron.

The primary circuit is comprised of two portions 18 and 19 which preferably are arranged mechanically as superposed coils separated from one another by means of the separator element 20. Two primary windings instead of a single one are provided to accommodate the use of the device on 110 volt or on 220 volt alternating current.

One of the primary windings 18 is connected respectively to terminals 21 and 22 on the terminal plate 6. The other of the primary windings 19 is connected to terminals 23 and 24 respectively on the terminal plate 6. Alternating current of 110 or 220 volts is supplied through the input cord 8, the terminals of which are connected respectively to the terminals 24 and 25 on the terminal plate 6, and a protector fuse is disposed across the terminal 25 and the terminal 21, partially to complete the primary circuit.

The primary coils 18 and 19 are connected in parallel when the arc welding device of the present invention is intended for use with 110 volt alternating current. These coils are connected in series when 220 volt alternating current is the primary source. The respective terminals on the terminal plate 6 are positioned thereon for interchangeable bridging by means of cross connection elements 26.

Figure 4:
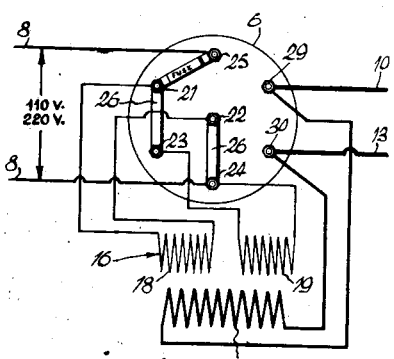
Figure 4 is a diagrammatic illustration of the electric circuit of the apparatus when the apparatus is intended to operate on the conventional 110 volt current available at an ordinary plug-out.
Figure 5:
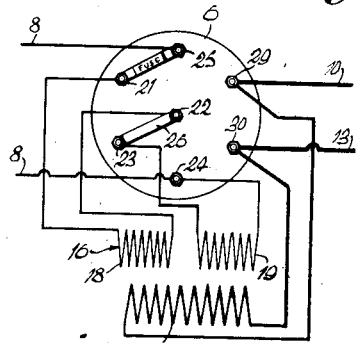
Figure 5 is a diagrammatic illustration of the electric circuit of the apparatus when the apparatus is adjusted to operate on 220 volt alternating current.

When the primary coils 18 and 19 are intended to be connected in parallel, a bridge connector 26 is disposed across the terminals 21 and 23, and a second bridge connector is disposed across the terminals 22 and 24, in the manner shown in Figure 4. On the other hand, when a series circuit connection of the primary coils 18 and 19 is desired to accommodate the operation of the device on 220 volt alternating current, a single bridge connector 26 is fastened across the respective terminals 22 and 23. By a simple manipulation of cross connectors at the terminal plate 6, the arc welding apparatus is adjusted quickly to accommodate one type of current or the other type. It may be mentioned in this respect that it is desirable frequently to use a series connection in conjunction with 110 volt current when light welding, or the welding together of light or fragile pieces of metal is intended.

The secondary winding wire 17 is wrapped around the primary assembly comprised of the coil assembly 16, and is separated therefrom by means of an insulator member 27. The whole coil structure finally is wrapped with insulator material such as wrapping tape 28 and thereafter if desired may be impregnated with varnish or like material in the well known manner. The terminals of the secondary winding are brought out from the coil assembly and connected respectively to the output terminals 29 and 30, with which the welding leads 10 and 13 are associated.

Figure 2:
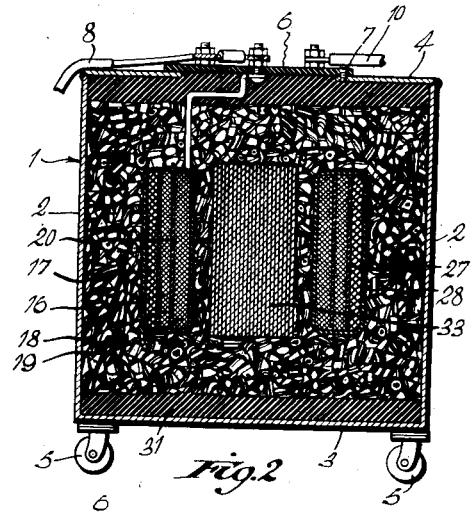
Figure 2 is a vertical cross section taken on the line 2—2 of Figure 1.

In housing the coil assembly within the magnetic scrap iron media or aggregate in the casing 1, a layer of ordinary roofer's pitch, tar, or other suitable material 31, first is provided at the bottom of the casing 1, and a quantity of the scrap iron media next is disposed in the casing over the tar. Then the coil assembly is rested on the scrap iron, substantially in the manner shown in Figure 2.

In the present specification the terms sheet trimmings, and punching scrap are intended to designate waste iron materials which average about an eighth of an inch to about one and one-fourth to one and one-half square inches in surface area and generally about 10, 12 or 16 gauge or lighter in thickness. And it is in this respect that the terms are used to designate the scrap materials of the present invention with which the windings are surrounded. It will be understood, of course, that the greater the area, the greater the leakage gap between the respective particles. The terms sheet trimmings and punching scrap are not intended to designate materials as fine as iron dust, which is too expensive and too difficult to handle, in order to provide practical results economically, nor laminated cores of magnetic iron which likewise are generally too expensive to suit the purposes of an inexpensive welding unit adapted to use in the homes, small shops and garages where the cost of an expensive unit cannot be justified. It is preferred that the scrap iron be substantially free from sharp corners or jagged piercing edges. The insulator tape wrapped around the coil assembly preferably is relatively heavy and the coil assembly may be impregnated if desired with an insulating varnish or impregnating material to provide an additional quota of protection for the coil winding, to minimize the chance of any of the scrap iron particles piercing through the insulated coating to short circuit the winding. Ordinary stamping scrap from punch press shops or like iron waste particles are suitable. Motor iron scrap of about the size indicated has been found to be particularly useful.

After the coil assembly is disposed over the layer of scrap iron within the casing 1, a condensed core 33 preferably is mounted in the coil aperture. The plug or core 33 comprises a laminated assembly of sheets of iron sized to fit very loosely within the aperture and the circular sector areas between the sides of the core and the internal periphery of the coil assembly are then filled with scrap of relatively small size. Punching scrap made in punching holes, of say about one-fourth inch to three-eighths inch diameter or small iron slugs or iron shot is suitable for filling these apertures, although the material of a larger size may be used if desired.

After the plug 33 has been mounted in the assembly in the casing 1, the casing next is completely filled with the iron scrap up to a level within an inch or two of the top of the casing. When the casing has been filled loosely with the scrap it is recommended that the box be vibrated vigorously to compact the particles, after which an additional quota of iron scrap may be added if desired. When the whole assembly is completed, hot tar or roofer's pitch or similar substance is poured into the casing until the casing is filled to a level adjacent the top. The hot tar permeates the interstices between the scrap and bits and particles of scrap iron and solidifies to integrate the elements of the apparatus into a rigidified structure. By means of the tar, any of the particles of scrap iron which have sharp piercing corners or edges are prevented from moving to pierce into the wound coils. At the same time the tar dissipates heat which might be generated when the device is used for heavy welding for long periods of time.

When the device is to be used continuously for extremely heavy welding loads, large sized iron scrap at one of the sides may be provided, so that the interstices will be large and so that a relatively large volume of tar at that side will be provided as a path for heat transfer to the exterior of the casing.

To assist the skilled in the art in the practical construction of the welding device of the present invention it may be mentioned that for 60 cycles service the primary coils 18 and 19 may comprise 135 turns each of No. 11 wire over a core of about four and one-half to five inches in diameter, while the secondary coil wound around the primary coils may comprise 58 turns of No. 4 copper wire. For 25 cycle service, suitable adjustment in the wiring may be provided. It will be understood that these precise electrical specifications can be varied to suit particular output current desired and are not designated as structural limitations.

The device of the present invention is extremely simple and inexpensive to construct. An element of expense is involved in the quantity of copper wire necessary to provide the coil assembly, but the scrap iron surrounding the coil may be purchased from one of a great many sources of supply at the prevailing price of scrap stock. The expense of elaborate electrical circuit, the expense of elaborate punched core assembly, and the expense of winding the coils intricately over the arms of the punched cores is eliminated entirely, yet the device under continuous and abnormal service conditions has been found to function consistently and satisfactorily without difficulty and at extremely economical costs.

Having described my invention, I claim:

1. A transformer suitable for arc welding purposes, comprising a casing, a substantially cylindrical bundle of primary and secondary windings in associated relationship within the casing, a terminal plate carried by the casing including terminals to which the terminals of the windings are connected, a core within the winding bundle comprising a bar portion made up of parallel laminae of the same size and shape disposed centrally within the winding bundle and punching scrap of about one-fourth to three-eighths inch average diameter filling the space between the bar portion and the winding surrounding it, and magnetic media embracing and surrounding the winding bundle within the casing, comprising sheet trimmings and punching scrap iron of pieces averaging about one-eighth to about one and one-half square inches in area, and generally approximately ten to sixteen gauge in thickness.

2. A transformer suitable for arc welding purposes, comprising a casing, a substantially cylindrical bundle of primary and secondary windings in associated relationship within the casing, a terminal plate carried by the casing including terminals to which the terminals of the windings are connected, a core within the winding bundle comprising a bar portion made up of parallel laminae of the same size and shape disposed centrally within the winding bundle and punching scrap of about one-fourth to three-eighths inch average diameter filling the space between the bar portion and the winding surrounding it, and magnetic media embracing and surrounding the winding bundle within the casing, comprising sheet trimmings and punching scrap iron of pieces averaging about one-eighth to about one and one-half square inches in area, and generally approximately ten to sixteen gauge in thickness, with non-magnetic media, such as tar, intermediate the interstices of the scrap pieces to rigidify and maintain the parts in the assembled relationship.

3. A transformer suitable for arc welding purposes, comprising a casing, a substantially cylindrical bundle of windings including two primary windings and a secondary winding in associated relationship within the casing, a terminal plate upon the casing having terminals to which the respective terminals of the windings are connected and including means for connecting the sets of primary windings of the bundle alternately in series and in parallel relationship, a core within the winding bundle comprising a bar portion made up of parallel laminae of the same shape and size and disposed centrally within the winding bundle and punching scrap of about one-fourth to three-eighths inch average diameter filling the space between the bar portion and the winding surrounding it, and magnetic media comprising sheet trimmings and punching scrap iron which average about one-eighth to one and one-half square inches in area, and generally about ten to sixteen gauge in thickness embracing and surrounding the winding bundle within the casing.

4. A transformer suitable for arc welding purposes, comprising a casing, a substantially cylindrical bundle of windings including two primary windings and a secondary winding in associated relationship within the casing, a terminal plate upon the casing having terminals to which the respective terminals of the windings are connected and including means for connecting the sets of primary windings of the bundle alternately in series and in parallel relationship, a core within the winding bundle comprising a bar portion made up of parallel laminae of the same shape and size and disposed centrally within the winding bundle and punching scrap of about one-fourth to three-eighths inch average diameter filling the space between the bar portion and the winding surrounding it, and magnetic media comprising sheet trimmings and punching scrap iron which average about one-eighth to one and one-half square inches in area, and generally about ten to sixteen gauge in thickness embracing and surrounding the winding bundle within the casing, with non-magnetic media, such as tar, intermediate the interstices of the scrap pieces to rigidify and maintain the parts in the assembled relationship.

ROLAND R. BOLLMAN.